United States Patent
Hansson et al.

(10) Patent No.: US 6,604,743 B1
(45) Date of Patent: Aug. 12, 2003

(54) REPLACEABLE WEARING SURFACE FOR A SEALING ARRANGEMENT

(75) Inventors: Stefan Hansson, Karlstad (SE); Bo Clarstrom, Kil (SE); Johan Eriksson, Karlstad (SE)

(73) Assignee: Kvaerner Pulping AB, Karlstadt (SE)

( * ) Notice: Subject to any disclaimer, the term of this patent is extended or adjusted under 35 U.S.C. 154(b) by 0 days.

(21) Appl. No.: 10/049,799

(22) PCT Filed: Jun. 26, 2000

(86) PCT No.: PCT/SE00/01343
§ 371 (c)(1),
(2), (4) Date: May 31, 2002

(87) PCT Pub. No.: WO01/12897
PCT Pub. Date: Feb. 22, 2001

(30) Foreign Application Priority Data

Aug. 18, 1999 (SE) ............................................. 9902925

(51) Int. Cl.[7] .................................................. F16J 15/34
(52) U.S. Cl. ...................... 277/370; 277/345; 210/398; 210/402; 68/158
(58) Field of Search ................................ 277/345, 348, 277/389, 370, 500, 571; 210/398, 402; 68/158

(56) References Cited

U.S. PATENT DOCUMENTS

| | | | | |
|---|---|---|---|---|
| 2,752,175 A | * | 6/1956 | Fletcher | 277/389 |
| 3,391,940 A | * | 7/1968 | Baugh | 277/565 |
| 3,612,546 A | * | 10/1971 | Otto | 277/565 |
| 4,545,764 A | * | 10/1985 | Gillies et al. | 432/115 |
| 4,684,176 A | * | 8/1987 | Den Besten et al. | 299/107 |
| 4,821,536 A | * | 4/1989 | Bardsley | 277/387 |
| 5,082,294 A | * | 1/1992 | Toth et al. | 277/551 |
| 5,927,106 A | * | 7/1999 | Pellerin | 68/140 |
| 6,494,675 B2 | * | 12/2002 | Pesek et al. | 415/172.1 |

FOREIGN PATENT DOCUMENTS

WO       WO 99/01611       * 1/1999       ............. D21F/3/08

* cited by examiner

Primary Examiner—Anthony Knight
Assistant Examiner—Vishal Patel
(74) Attorney, Agent, or Firm—Rolf Fasth; Fasth Law Offices

(57) ABSTRACT

The replaceable wearing surface is for a sealing arrangement on drum end walls on a press drum that de-waters fiber suspensions radially into the drum through the shell of the drum. The wearing surface of the sealing arrangement has a wear ring and holder members. The wear ring is, on a side that faces into the drum from the drum end-wall, provided with locking members. The locking members are arranged parallel to the drum axis and are preferably in the form of knob-shaped locking members. The arms of the holder members are designed to engage the locking members. The holder members are fastened to the drum end wall by suitable fixing members.

12 Claims, 5 Drawing Sheets

REPLACEABLE WEARING SURFACE FOR A SEALING ARRANGEMENT

TECHNICAL FIELD

The invention relates to a replaceable wearing surface for a sealing arrangement.

BACKGROUND AND SUMMARY OF THE INVENTION

In presses for de-watering liquid suspensions, in particular fiber suspensions, where the presses have at least one rotatable screening drum and the de-watering takes place radially into the drum(s), the suspended material is de-watered by the liquid in the suspension passing through a perforated or slotted, often cloth-covered, surface shell of the drum(s) which is (are) arranged partly submerged in a trough containing the liquid suspension. The suspended material then forms a cake or a web on the outside of the surface, which may be cloth-covered, and is removed. New liquid suspension and, if appropriate, treatment liquid are supplied to the trough as liquid and solid material are removed by the drum(s).

The construction of such presses requires that the suspension is not allowed to escape over the end walls of the drum(s). For this reason, sealing arrangements are necessary between the drum(s) and the trough.

The sealing between the trough and the drum(s) is effected between a stationary surface and a surface in continuous motion, that is to say between generally annular or circular-segment-shaped sealing elements arranged on the trough and an annular sealing element on the drum end walls on the rotating drum(s). This means that, on account of the rotation of the drum(s) and a certain inevitable penetration of suspended material between the sealing surfaces, the sealing surfaces are subjected to wear, for which reason the sealing elements with their sealing surfaces or what are known as wearing surfaces must be easily replaceable, which means that the method of fastening the sealing elements on in particular the drum end walls is important.

The known art for fastening sealing elements on the drum end walls involves fastening by welding and/or by radial or axial screw connections through the wearing surfaces, or by shrinking, all of these fastening methods having disadvantages. It is not suitable, for example, to fasten them on the drum end walls by welding because this leads to thermal stresses in the sealing elements with dimensional changes as a consequence and moreover destroys any surface finish of the wearing surface of the sealing elements,. which results in a shortened life. Nor is it suitable to fasten them by screw connections, made axially in relation to the drum, through the wearing surfaces on the drum end wall because this on the one hand reduces the area of the wearing surfaces or alternatively means that the area must be increased and on the other hand means that the material in them must be made thicker in order to accommodate the head of the screw in the screw connection. In most cases, this means that the entire wear ring has to be replaced in spite of only a few percent of the thickness having been worn down, which results in each replacement of the wearing surface being extremely expensive.

Nor is it suitable to fasten them on the drum end walls by designing them as cover-like arrangements fastened to or on the drum shell because this reduces the de-watering surface area of the drum and moreover results in a connection which is unsuitable in terms of forces. Shrinking is not suitable either as an alternative fastening method because secure shrinking of a large thin ring is very exacting as far as tools and tolerances are concerned, which makes this method expensive.

PCT/SE98/01247 describes a sealing element in the form of a segmented sealing ring for a drum end wall intended inter alia for axial sealing between the drum end walls and a trough. The sealing ring segments are fastened by axial screw connections and welded joints. In this case, use is made of screw connections, made axially in relation to the drum, through the wearing surfaces on the drum end wall, which reduces the area of the wearing surfaces. It also results in it being necessary to demount the drum, or alternatively the parts of the housing against which the end wall seals, in order for it to be possible to demount the seal.

SE-C 501 710 and SE 93 02 898-3 describe other types of sealing arrangements in the same type of press, where sealing arrangements are arranged between a submersible part of the trough and a rigidly arranged part of the trough, that is to say between two parts which are stationary in relation to one another during continuous operation. SE-C 380 300 shows diagrammatically another seal with specific seal components without going into their construction in greater detail. In the type of press concerned, the sealing is important as the liquids which are pressed out of the fiber suspension are to be or at least are intended to be used/re-circulated in a closed system and are therefore to be recovered. Leakage in the presses means that great quantities of impure liquids have to be cleaned away around the machine and destroyed.

The present invention relates to a replaceable wearing surface for a sealing arrangement in presses with at least one rotatable press drum which de-waters fiber suspensions by the liquid in the suspension passing radially into the drum through a shell surface, which may be cloth-covered, on the drum(s), a cake or a web of the fiber material being formed on the outside of the shell surface which may be cloth-covered. The replaceable wearing surface for the sealing arrangement according to the invention constitutes part of an axial seal between the end walls of the press drum(s) and a trough in which the drum(s) is (are) partly submerged and relates to that part of this seal which is arranged on the drum end walls.

One object of the present invention is to provide a replaceable wearing surface for a sealing arrangement which is easily mountable and thus easily replaceable when the wearing surface has become unserviceable, and in which the problems of the known art described above relating to fastening the wearing surface in the sealing arrangement are eliminated. Accordingly, a sealing surface can be provided over the entire radial extent of the wear ring without fixing elements encroaching on the extent of the wearing surface.

It is also the object of the present invention to provide a sealing arrangement with a wearing surface which can be prepared in advance, for example by hard-metallization, where no finishing is required on replacement, which prolongs the life of the sealing arrangement. At the same time, the wearing surface part can be optimized for its function as a replaceable wear part.

DETAILED DESCRIPTION

Figure 1:
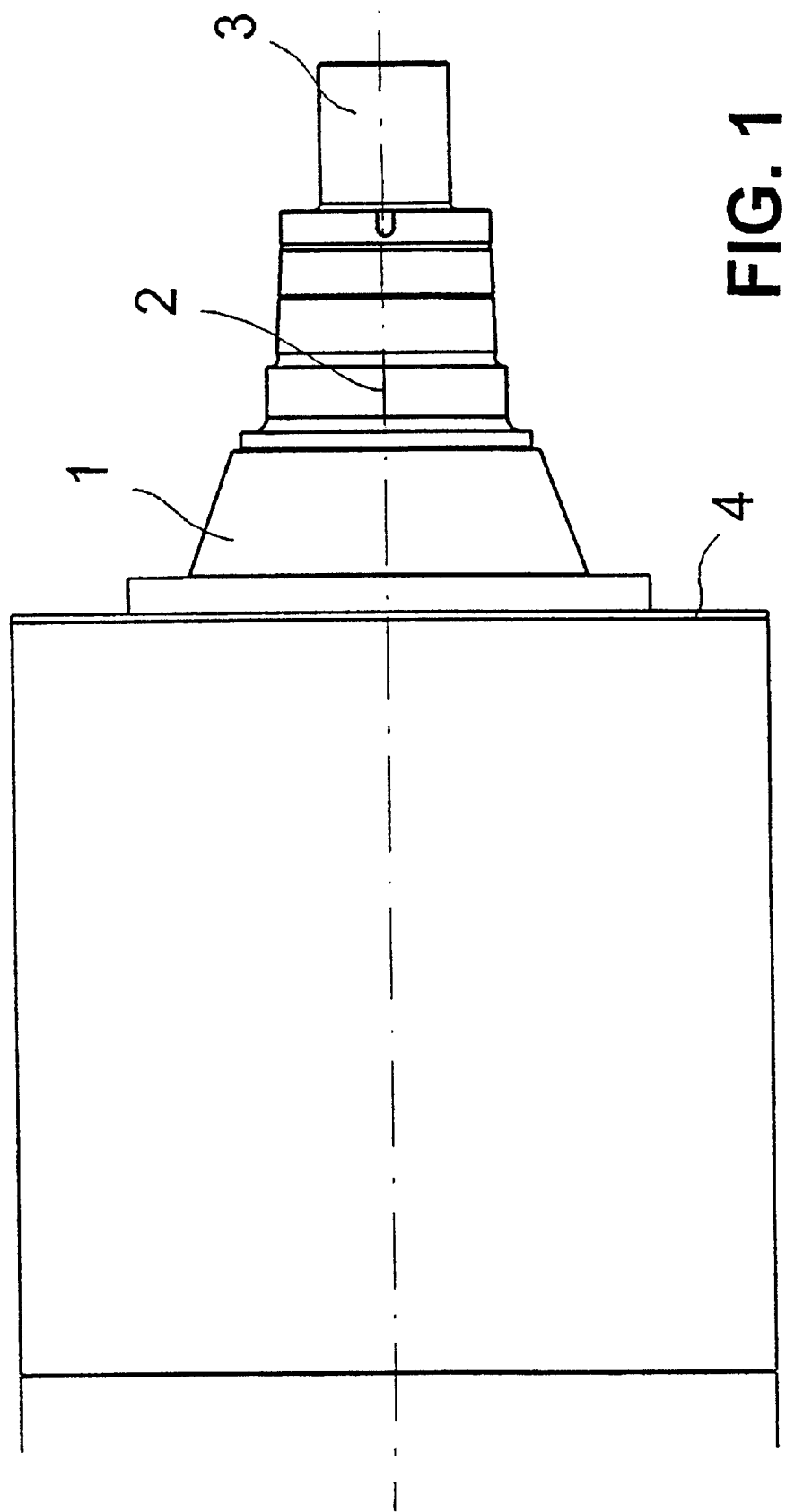
FIG. 1 shows a side view of one end of a press drum.

FIG. 1 shows a view of one end of a press drum 1 in a press which is used for de-watering a paper pulp suspension and is arranged so that the press drum 1 can rotate about a shaft 2 supported by a shaft end 3. The present invention relates to an annular replaceable wearing surface for a sealing arrangement 4 on the drum end wall.

Figure 2:
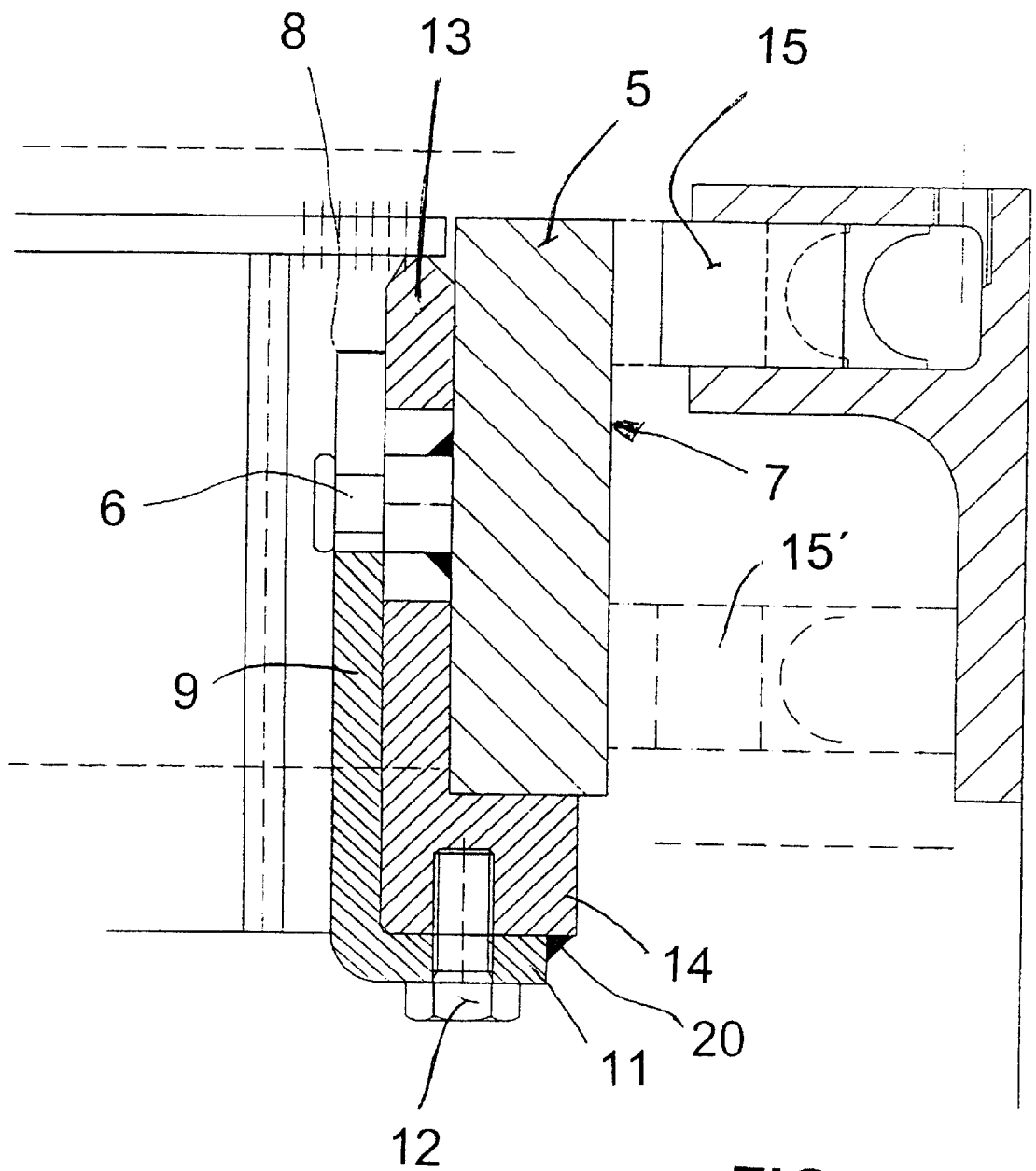
FIG. 2 shows a detailed view of a replaceable wearing surface for a sealing arrangement according to the invention.

FIG. 2 is a detailed view of a replaceable wearing surface for a sealing arrangement 4 according to the invention. This comprises a wear ring 5 that extends around the outer edge of the drum end wall 13, 14 and L-shaped holder members 8. The wear ring 5 has a wearing surface 7 and an opposite surface which, after mounting on the drum, faces radially into the drum from the drum end wall, this opposite surface being provided with knob-shaped members 6 arranged parallel to the drum axis. In one embodiment, the wear ring 5 is divided diametrically into two segments or halves, shown in FIG. 4 as two 180° segments 5a and 5b respectively, so as to be easily mountable, but can of course be complete or divided into more than two segments. The number of segments can vary depending on the size of the press drum, but is usually between 1 and 15. 15 segments give a coverage of 24° per segment. An advantage of segmenting into a number of parts is that replacement of a wear ring can be effected by indexing the drum forwards step-by-step to a position in which only one sector of the end wall of the drum is exposed and there replacing the exposed segment.

Figure 3:
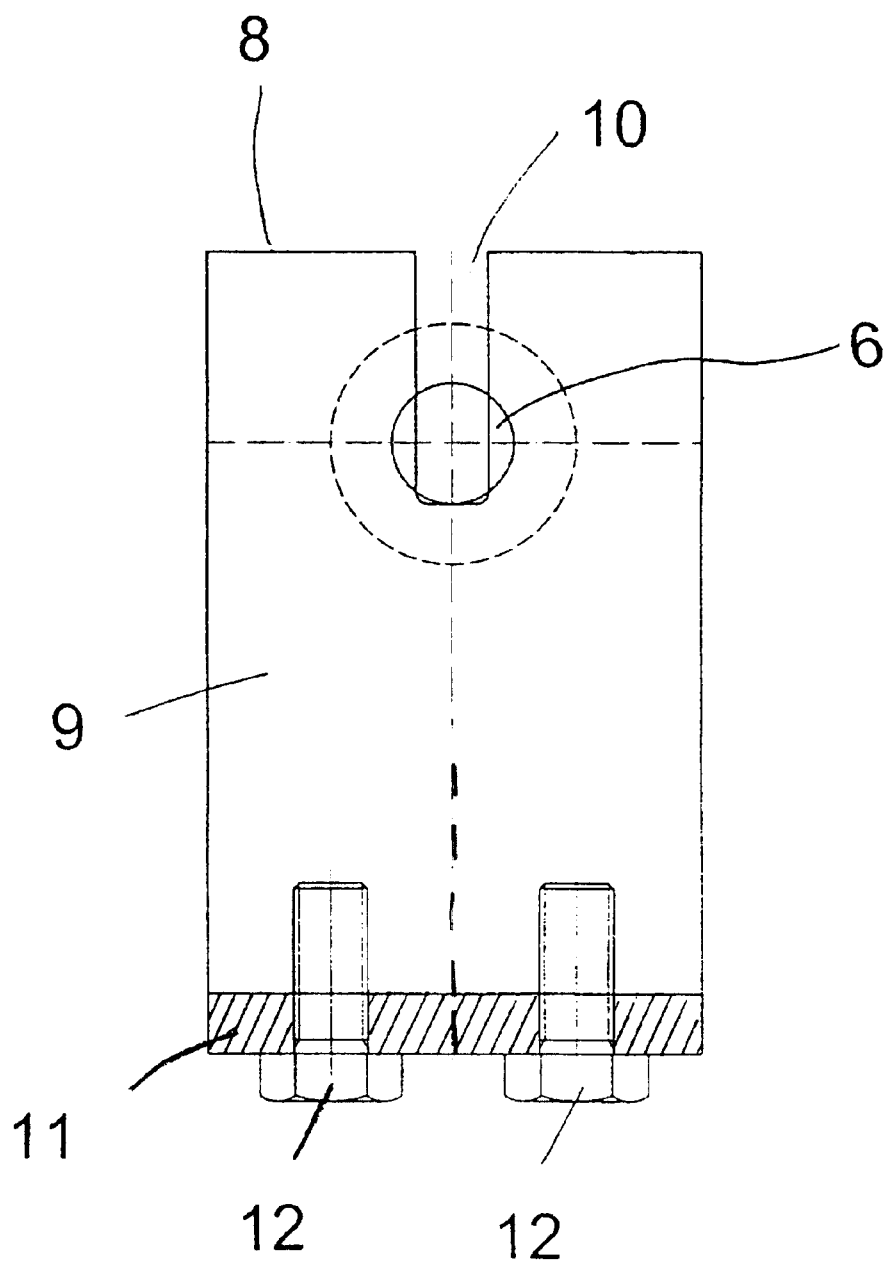
FIG. 3 shows a holder member which constitutes part of the replaceable wearing surface for a sealing arrangement according to the invention.

FIG. 3 shows in greater detail the L-shaped holder members 8. The first leg 9 of the L-shaped holder members is provided with a slot 10 that is designed so as to engage under the knob on the knob-shaped member 6 and in this way hold the wear ring 5 in position against the support element 13 and the end wall 14 of the drum and at the same time prevent the wear ring 5 from moving axially outward from the drum 1.

This first leg can have constant thickness but is preferably wedge-shaped, in other words slightly tapered, towards the outer end of the leg 9, so that the first leg has its minimum thickness at the outer end at the beginning of the slot 10. By means of such a wedge shape of the first leg 9, the wear ring 5 is clamped against the drum end wall 13, 14 with great force.

The second leg 11 of the L-shaped holder member 8 is designed to be fastened to the drum end wall 13, 14 by a screw connection 12 directed radially outward in relation to the drum axis and thus lock the holder member 8 in the appropriate position. If desired, the screws in the screw connection 12 can be secured by tack welds (not shown) or other types of locking element such as lock washers acting against the second leg 11 of the holder. A tack weld 20 can also be used as an extra means of securing the L-shaped holder to the drum end wall.

The support element 13 can be a component which is separate from the drum end wall 14 and ring-shaped, preferably divided diametrically into two or more segments, or halves, so as to be easily mountable, but can also be in the form of a complete ring. The support element 13 can also be an integral part of the drum end wall 14.

Figure 4:
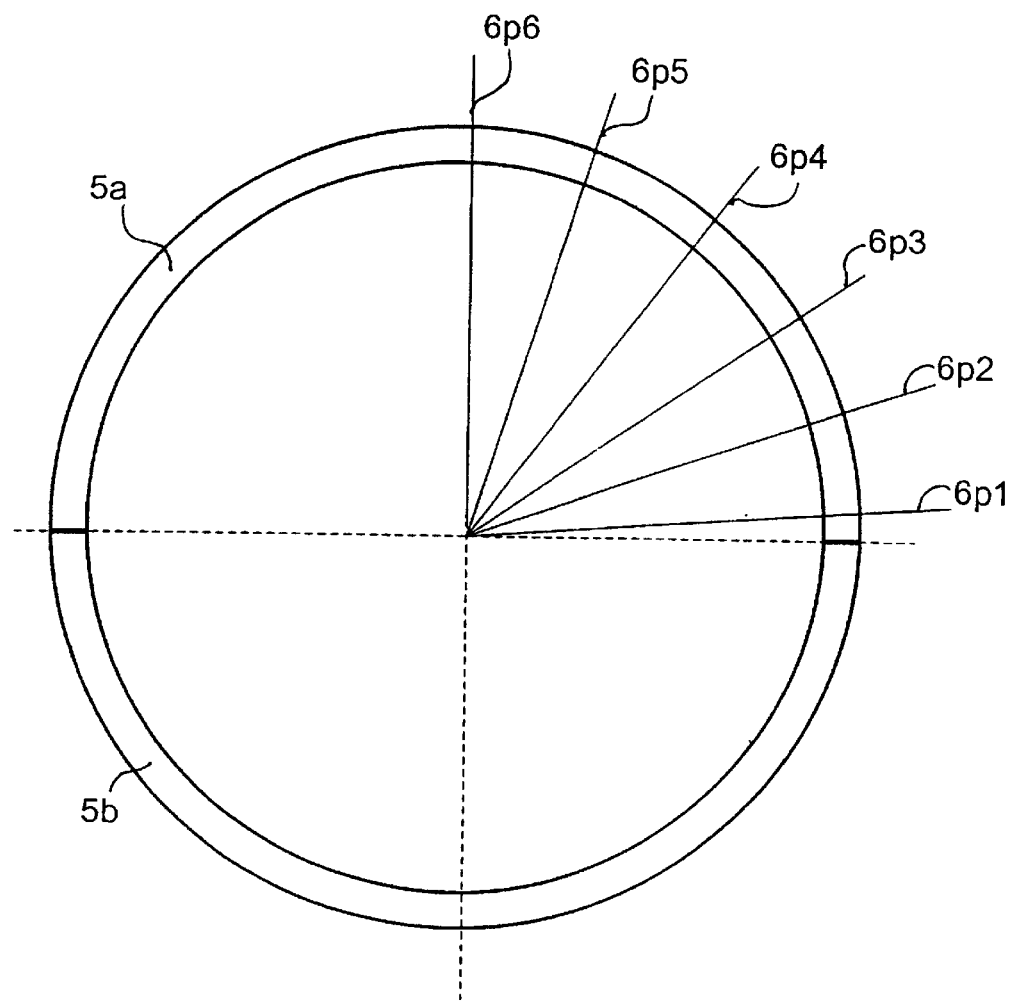
FIG. 4 shows a wear ring according to the invention in a side view divided into two sections.

FIG. 4 indicates a number of positions 6p1–6p6 for the knob-shaped member 6 over a quarter of the circumference of the wear ring. The knob-shaped member which is arranged in a position 6p1 closest to the division between the two halves 5a and 5b respectively is preferably to be arranged as close to the division as possible. FIG. 4 shows six positions for the knob-shaped member, which gives eleven positions for each half 5a and 5b respectively. In wash presses of relatively great diameter, use is of course made of more knob-shaped members, and the total number can vary from four to fifty knob-shaped members, preferably one for every or every other drainage cell in the drum. Normally, there are thirty drainage cells in the drum, and therefore fifteen or thirty knob-shaped members.

Figure 5:
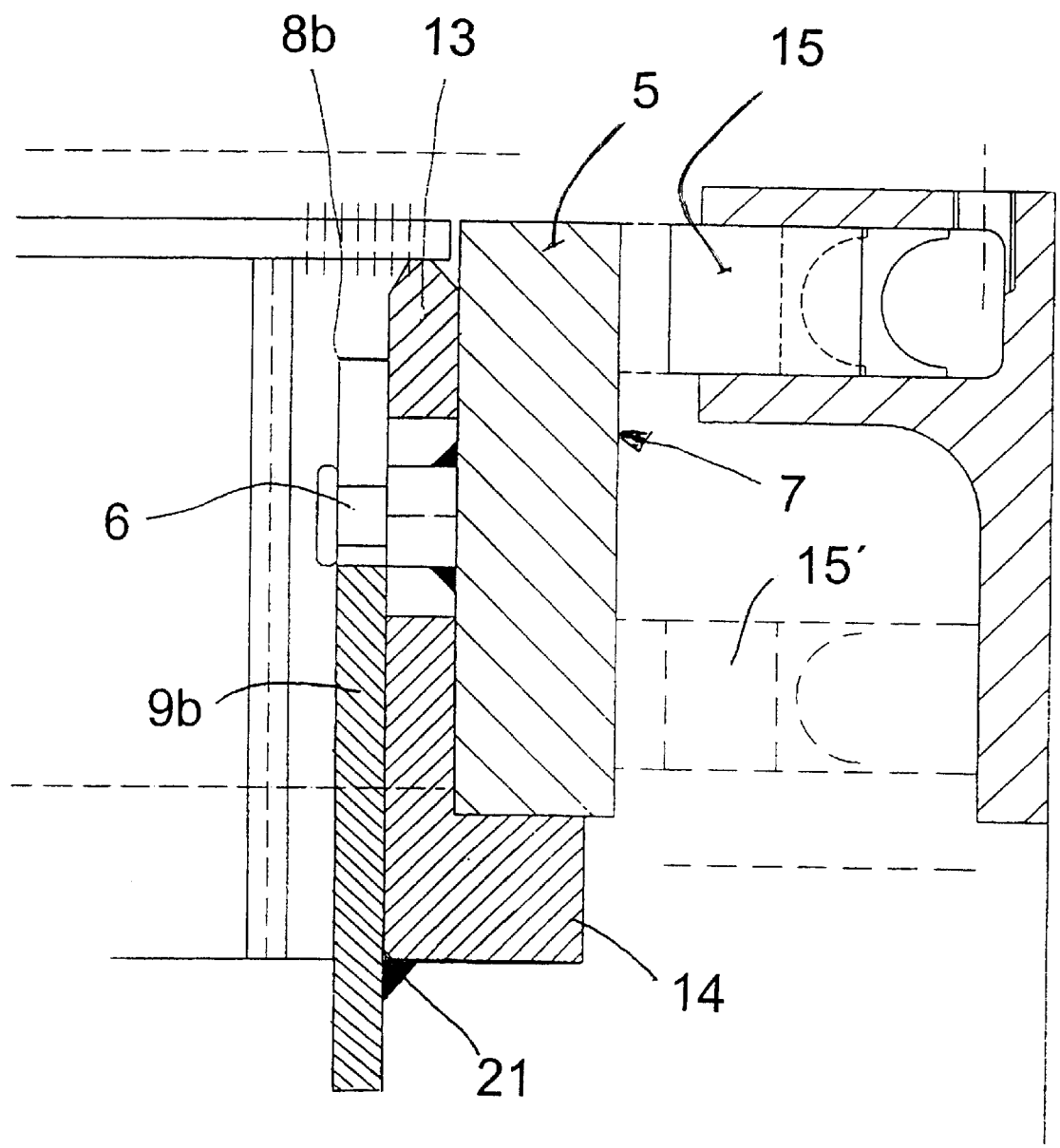
FIG. 5 shows a detailed view of a preferred alternative embodiment of FIG. 2.

FIG. 5 shows an alternative embodiment of the holders, in which the L shape of the holders has been replaced by a slightly wedge-shaped flat bar 8b. In this simplified variant, the arm/wedge 9b is pressed out radially under the knob 6, after which the flat bar is fastened to the end wall part 14 by means of a tack weld 21. This embodiment makes it possible to avoid the drilling and threading operations for fixing screws, which increase the cost. Another advantage is that adequate clamping force is developed against the wear ring when a second leg does not bear against drum end wall portions 14.

Figure 6:
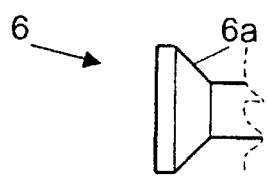
FIG. 6 shows an alternative embodiment of a knob-shaped locking member.

FIG. 6 shows an alternative embodiment of a knob-shaped locking member 6. In this case, the knob-shaped locking member has a tapered surface 6a on the inside of the knob, against which the locking arm engages. The taper can therefore be formed on the inside of the knob or on the arm 9 or on both.

In a preferred embodiment, the sealing arrangement 4 is arranged in a special de-watering press, what is known as a wash press, for a paper pulp suspension. The wash press comprises two counter-rotating press drums arranged partly submerged in a trough. The rotation of the drums forces the pulp web formed up between the two drums, pressing it simultaneously in the nip between them. The fact that it is a wash press means that treatment liquid is also supplied to the press, preferably the trough, in order to reduce the concentration of any undesirable loose and/or finely divided material there may be in the pulp suspension supplied.

A seal 15 arranged on the end walls of the trough interacts with the wearing surface 7 on the wear ring 5. The seal 15 is not the subject of this invention but is described in greater detail in Swedish Patent Application SE-A 9902308-7 entitled "Sealing arrangement for pulp de-watering arrangement" filed at around the same time as this application.

As a result of the special design of the replaceable wearing surface for the sealing arrangement according to the invention, the wear ring 5 can be made radially wider, and the area of the wearing surface 7 is thus also increased in comparison with the embodiment according to the known art. The larger wearing surface 7 of the wear ring 5 means that the seal 15 can be arranged so as to act along different radii on the wear ring, for example the position 15'.

Alternatively, the seal 15 can lie eccentrically in relation to the drum end wall so as to prevent the seal 15 lying and wearing in the same groove on the wearing surface 7 throughout the entire revolution.

The present invention can be varied in a number of ways within the scope of the patent claims. For example, the knob-shaped members of the wear ring can be replaced by radially directed grooves in the wear ring itself, which are open radially inward and in which the arms of an L-shaped holder 9 or flat-bar-shaped holder 9b engage. The knob 6 can also be replaced by a U-shaped part, into which the wedge is driven. With an L-shaped holder, the second leg of the holder can also be angled inward towards the drum, seen from the drum end wall.

The essential feature of the present invention is that the leg 9, 9b of the holder 8, 8b can be slipped in towards the wear ring from a radially retracted position and then out towards a radially external position in which it locks the wear ring in the axial direction of the drum. The taper of the leg 9, 9b of the holder can also be replaced by a corresponding taper on interacting surfaces on the knob 6 or by interacting surfaces in corresponding radially directed grooves in the wear ring itself.

The leg 9, 9b of the holder can also be given the shape of a curved convex spring which, under spring action from the leg 9, 9b itself, presses the wear ring into position by spring force. The taper of the leg 9 in the L-shaped variant can also be sufficiently marked that the wear ring 5 is pressed into a fixed position before the second leg 11 of the holder comes into contact with the drum end wall 14. In the flat-bar-shaped variant 8b, the correct clamping force is ensured by a certain minimum, but limited, projection on that end of the holder facing away from the groove remaining after pressing in.

The knob-shaped members 6 can also be fastened to the wear ring by key-shaped locking recesses arranged in the wear ring, which interact in a conventional manner with congruent key-shaped projections on one end of the members 6, so that this end can be introduced into the keyhole in the wear ring and rotated through 90° into a positive-locking position. The other end of the members can then also have a rectangular or oval shape so that the slot 10 interacts with the member so that rotation in the keyhole in the wear ring is prevented.

While the present invention has been described in accordance with preferred compositions and embodiments, it is to be understood that certain substitutions and alterations may be made thereto without departing from the spirit and scope of the following claims.

What is claimed is:

1. A replaceable wearing surface for a sealing arrangement on drum end walls on a press drum that de-waters fiber suspensions radially into the drum through the shell of the drum, comprising:
   a wear ring mounted on the drum, the wear ring having a locking member on a side that faces into the drum from a drum end wall, the locking member extending in an axial direction of the drum;
   a holder member having at least one radially directed arm, the arm being designed to interact with the locking member, when the arm is pressed out in a radial direction of the drum, to secure the wear ring in the axial direction against the drum end wall, the holder member having at least one interacting fixing connection for fastening the holder member to the drum end wall.

2. The replaceable wearing surface for the sealing arrangement according to claim 1 wherein the arm is arranged to interact with the locking member via a wedge-shaped surface that extends in a plane parallel to the drum end wall.

3. The replaceable wearing surface for the sealing arrangement according to claim 2 wherein the wedge-shaped surface is arranged on the locking member.

4. The replaceable wearing surface for the sealing arrangement according to claim 2 wherein the wedge-shaped surface is arranged on the arm at a minimum thickness of an outer end of the arm along the radial direction of the drum.

5. The replaceable wearing surface for the sealing arrangement according to claim 4 wherein the arm has a radially directed slot defined therein, the slot is open at the outer end of the arm.

6. The replaceable wearing surface for the sealing arrangement according to claim 5 wherein the wear ring is in operative engagement with provided with the locking member so that the locking member is parallel to the drum axis and the slot engages the locking member.

7. The replaceable wearing surface for a sealing arrangement according to claim 6 wherein the locking member is a knob-shaped member that is arranged in a number of positions along a circumference of the wear ring.

8. The replaceable wearing surface for a sealing arrangement according claim 1 wherein the holder member is plate-shaped along a plane of the arm and the arm is fastened to the drum end wall.

9. The replaceable wearing surface for a sealing arrangement according to claim 1 wherein the holder member is L-shaped, with the arm constituting a first leg extending in the radial direction of the drum, and a second leg arranged parallel to the axial direction of the drum.

10. The replaceable wearing surface for a sealing arrangement according to claim 9 wherein the second leg is designed to be fastened to the drum end wall.

11. The replaceable wearing surface for a sealing arrangement according to claim 1 wherein the wear ring is divided diametrically into two semi-circular parts.

12. The replaceable wearing surface for a sealing arrangement according to claim 1 the wear ring has a wear surface that faces outwardly from the drum end wall, the wear surface is arranged parallel to the drum end wall and bearing against a sealing element.

\* \* \* \* \*